Nov. 11, 1969  J. A. GIORDMAINE ET AL  3,478,277
OPTICAL MODE SELECTOR
Filed June 24, 1964  3 Sheets-Sheet 1

INVENTORS J. A. GIORDMAINE
W. K. KAISER
BY Ralph M Braunstein
ATTORNEY

3,478,277
Patented Nov. 11, 1969

3,478,277
OPTICAL MODE SELECTOR
Joseph A. Giordmaine, Summit, N.J., and Wolfgang K. Kaiser, Munich, Germany, assignors to Bell Telephone Laboratories, Incorporated, New York, N.Y., a corporation of New York
Filed June 24, 1964, Ser. No. 377,546
Int. Cl. H01s 3/05
U.S. Cl. 331—94.5
11 Claims

ABSTRACT OF THE DISCLOSURE

An optical mode selector comprises an interface between regions of high and low refractive index which when inclined at or near the critical angle for total internal reflection discriminates between axial and non-axial modes by attenuating the latter but not the former. Means are also provided for intercepting axial modes totally reflected from the interface at the critical angle and reversing their direction of propagation to reincidence on the interface at the critical angle.

---

This invention relates to optical reflectors and, more particularly, to optical reflectors adapted to selectively reflect light waves propagating in a preferred direction. Reflectors of this type are useful, for example, as mode selectors for optical masers.

The invention of the optical maser has made possible the generation and amplification of coherent electromagnetic waves in the optical frequency range, which is generally considered to extend from the far infrared portion of the spectrum to beyond the ultraviolet. Due to the extremely high frequency associated with wave energy in this range, the coherent waves produced by optical maser devices are capable of transmititng enormous quantities of information. Thus, the resultant extension of the usable portion of the electromagnetic spectrum has greatly increased the number of frequency channels available for communications and other uses. In addition, the coherent and relatively monochromatic light beam produced by an optical maser is inherently capable of being focused to an extremely small spot, thereby opening the door to applications such as precision drilling, cutting, welding and even surgical processes requiring localized high energy densities.

In a number of applications of optical masers it is highly desirable that the coherent output beam be as nearly perfectly collimated as possible to minimize its angular divergence or spread. In a long distance terrestrial optical maser communications system, for example, or in a system which includes a transmission path between a planet and a space vehicle or between two space vehicles, even a very small amount of beam spread resulting from off-axial modes may be unacceptable. A highly collimated beam on the other hand, offers advantages in effective range and economy of transmitted power as well as in security—freedom from detection or interference, either natural or manmade.

The angular spread of a perfectly collimated light beam is ultimately determined by diffraction effects caused by the finite size of the effective aperture through which the beam is emitted. In one common type of optical maser this aperture is a partially reflective, partially transmissive member forming one end of an elongated optical cavity resonator. Other means, known in the art, may of course be employed to abstract stimulated emission from optical resonators. To produce an output beam with angular divergence reduced to the theoretical diffraction limit, the resonator must be adapted to operate substantially in axial modes only.

The light emission from many types of optical masers, however, has an angular beam width one or two orders of magnitude greater than the minimum width set by diffraction. This broad emission, associated with oscillation in a large number of modes in one or more orders, occurs in resonators for which the discrimination against off-axis modes is less than perfect. Such discrimination may be provided by diffraction or wall losses as discussed in an article by A. G. Fox and T. Li, entitled Resonant Modes in a Maser Interferometer, Bell System Technical Journal, volume 40, page 453 (March 1961). Mode selection by means of nonuniform pumping of the active optical maser medium or by nonuniform reflectivity of the mirrors defining the optical cavity resonator is disclosed in copending United States patent application, Ser. No. 256,213, filed Feb. 1, 1963, by R. J. Collins and J. A. Giordmaine. Mode selection by means of an intracavity optical system is disclosed in copending United States patent application, Ser. No. 226,975, filed Sept. 28, 1962, by J. E. Geusic and J. G. Skinner. Each of these applications has been assigned to the assignee hereof.

Optical cavity resonators embodying the invention are useful, not only in optical masers, but in other optical applications where a high degree of discrimination against off-axis modes is desired. Directionally sensitive reflectors in accordance with the invention also find utility in other types of optical apparatus where cavity resonators are not employed.

The present invention is based upon the fact that the reflectivity of an interface between regions of high and low refractive index is, for light rays incident thereon from within the high index region, strongly dependent upon the angle of incidence for angles near the critical angle for total internal reflection.

In one illustrative embodiment of the invention, apparatus for selectively reflecting light rays propagating in a predetermined direction comprises an interface between regions of high and low refractive index and means for admitting into said high index medium light rays propagating in the preferred direction. The interface is inclined to the path of the preferred rays at susbtantially the critical angle for total internal reflection. Means are also provided for intercepting rays totally reflected from the interface at the critical angle and reversing their propagation direction to reincidence on the interface at the critical angle. Such rays are then directed back over the path of original incidence.

Light rays which enter the high index region and are incident on the interface at angles other than the critical angle undergo one or more *nontotal* internal reflections before emerging therefrom in attenuated form. Thus, the directional sensitivity of total internal reflection near the critical angle may be employed to discriminate against off-axis modes in an optical maser. Reflectors of the type disclosed herein are especially useful in high gain optical masers having mirrors of relatively low reflectivity since diffraction losses in such devices may be quite small compared to other losses, even for modes which radiate at relatively large angles from the resonator axis.

The objects and features of the invention will be fully and more clearly understood from the following discussion taken in conjunction with the accompanying drawings, in which.

Figure 1:
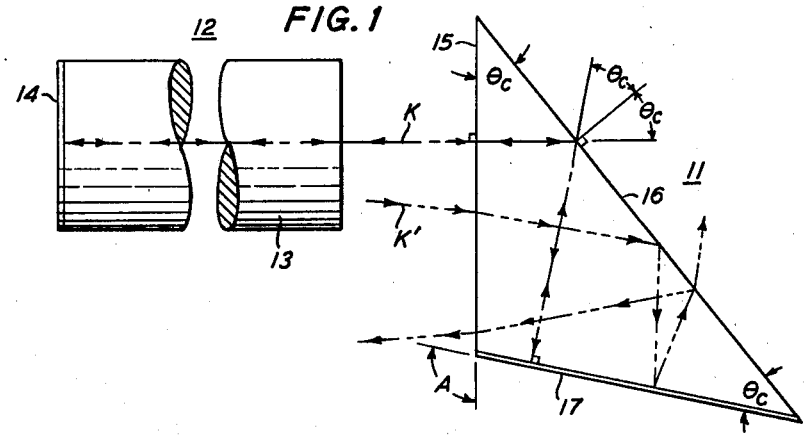
FIG. 1 depicts an optical maser with a critical angle prism embodying the invention, in which light rays travelling in the preferred direction for reflection enter the prism at normal incidence.

Turning now to FIG. 1 there is shown a critical angle prism 11 embodying the principles of the invention. The prism 11 is illustrated in conjunction with an optical maser or laser 12 represented by an active medium 13 which may be, for example, a solid-state material such as ruby. Auxiliary equipment associated with the laser 12, such as pumping and cooling apparatus, has been omitted from the drawing in the interest of clarity. A reflector 14 is placed at the end of the medium 13 removed from the prism 11.

The cross-section of prism 11 is an isosceles triangle having base angles $\theta_c$ which are substantially equal to the critical angle for total internal reflection. A side 15 of the prism 11 forms an entrance face through which light rays are admitted into the interior. If desired, the entrance surface 15 may be provided with an antireflection coating of a type known in the art. The side 16 of the prism 11 opposite the vertex angle A forms an interface between the material of the prism, which is of a transparent material having a relatively high refractive index, such as an optical glass or a substance such as strontium titanate, and the surrounding medium which may be, for example, air. The side 17 of the prism 11 is provided with a reflective coating which may be a metallic layer or a multilayer dielectric.

Light rays propagating along the preferred direction such as the axial direction of the optical maser 12, enter the prism 11 through the entrance surface 15 at normal incidence and are incident on the interface 16 at substantially the critical angle for total internal reflection. The path of the preferred rays is shown by the line K in FIG. 1. The totally reflected light rays then travel to the reflective surface 17 where they are normally incident and are reflected back along the path by which they arrived.

The course of light rays travelling in off-axial directions is illustrated by the line K' in FIG. 1 which enters the prism through the surface 15, is refracted, and is incident on the interface 16 at an angle greater than the critical angle $\theta_c$. As a result, the ray is totally internally reflected and proceeds to the reflective surface 17 where it is reflected over a different path back to the interface 16 where it is, however, incident at an angle smaller than $\theta_c$. As a result, a portion of the ray passes through the interface and is lost while the remainder is internally reflected to incidence at the surface 15 where a portion emerges and is refracted while the further attenuated remainder is internally reflected. Similar lossy paths may be traced for other nonpreferred angles of incidence at the entrance face.

From the foregoing, it can be seen that light rays entering the prism 11 through the entrance face 15, in the preferred direction, are reflected back along the path by which they arrive with only the small losses attendant upon the nontotal reflection at the reflective surface 17; while light rays incident on the entrance face 15 at angles other than the preferred undergo multiple internal nontotal reflections by which they are attenuated before emerging in a direction different from that at which they entered. Rays travelling in the nonpreferred directions have rapidly increasing reflection losses as the deviation from K increases. The ratios of the reflected amplitudes to the incident amplitudes are given as functions of the incident angle $\theta_i$ by the following equations:

$$R_{\parallel} = 1 - \frac{2n\sqrt{1-n^2 \sin^2 \theta_i}}{\cos \theta_i + n\sqrt{1-n^2 \sin^2 \theta_i}} \quad (1)$$

$$R_{\perp} = 1 - \frac{2\sqrt{1-n^2 \sin^2 \theta_i}}{n \cos \theta_i + \sqrt{1-n^2 \sin^2 \theta_i}} \quad (2)$$

where $$R_{\parallel} \text{ and } R_{\perp}$$

are the ratios for waves with polarizations parallel and perpendicular respectively to the plan of incidence; $n$ is the refractive index of the prism with respect to the ambient external medium; and $\theta_i$ is the angle of incidence.

Figure 2:
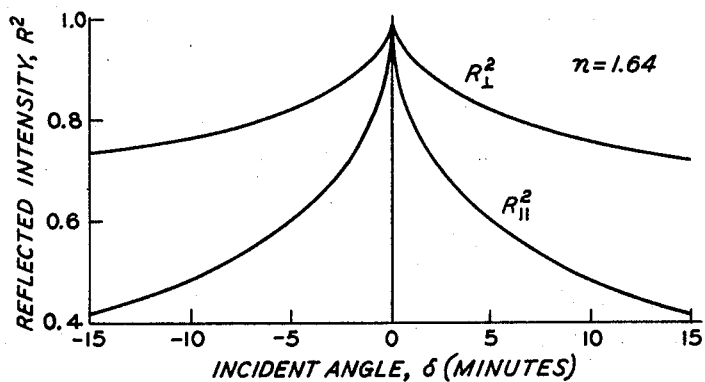
FIGS. 2 and 3 are plots of parameters useful in explaining the invention.

From Equations 1 and 2 it follows that, for $\theta_i$ close to $\theta_c$ the reflectivity changes more rapidly for parallel polarization than for perpendicular polarization by a factor of $n^2$. The fractional reflected intensity $$R_{\parallel}^2 \text{ and } R_{\perp}^2$$

calculated from Equations 1 and 2 are plotted in FIG. 2 for angles of incidence near the critical angle, for the case of $n=1.64$. $\delta$, measured on the abscissa, represents the angular deviation, in minutes of arc, from $\theta_c$. The total reflection loss for the parallel polarization is given by $$R_{\parallel}^2$$

multiplied by the reflectivity of mirror 17.

It can be seen from FIG. 2 that the reflectivity decreases from 1.00 at the preferred direction to 0.75 at a deviation angle of about 100 seconds, giving substantial selectivity.

If the prism angle $\theta_p$ is slightly larger than $\theta_c$, the reflectivity of the prism is very close to 1.0 over a range of angles $2(\theta_p - \theta_c)$. For a given prism and wavelength this quantity can be adjusted over a significant range by varying the prism temperature. For example, a 50° C. temperature change in a flint glass prism produces a change of about one minute in $\theta_p - \theta_c$. Other measures may be utilized to vary the refractive index of the prism or of the medium outside the reflecting interface.

Figure 3:
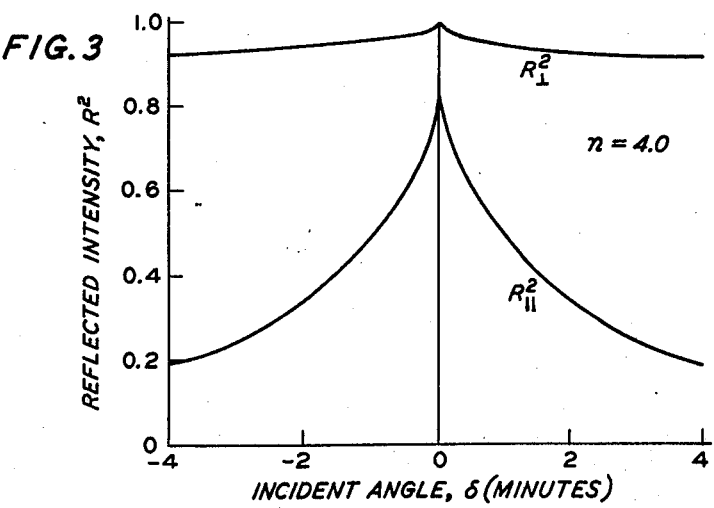

Substantially higher selectivity is easily achieved in the infrared where high index materials of good optical quality are available. Beyond $2\mu$, for instance, germanium having a refractive index $n=4$ to $n=4.1$ is especially suitable. FIG. 3 shows the fractional reflectivity of a germanium prism, for which $$R_{\parallel}^2$$

changes from 1.00 at the preferred direction to 0.75 at a deviation of eight seconds.

When employed as a mode-selecting reflector in conjunction with the optical maser 12, the critical angle prism 11 is placed with its entrance face 15 normal to the preferred direction which is defined by the axis of the resonator portion containing the active medium 13. In such an arrangement, the optical cavity resonator of the optical maser may be regarded as being formed by the reflective surfaces 14 and 17 which, in conjunction with the interface 16, define a light beam path through the active medium 13.

It can be seen from FIGS 2 and 3 that the angular selectivity of the simple prism 11 shown in FIG. 1 is greater for waves polarized parallel to the plane of incidence than for those polarized normal thereto. Thus, for maximum angular selectivity, it is desirable that the light incident on a prism of the invention be polarized parallel to the plane of incidence. In an optical maser employing the mode selector of the invention, stimulated emission of the preferred polarization may be encouraged by means of an intracavity polarizer such as, for example, a Brewster angle plate.

Figure 4:
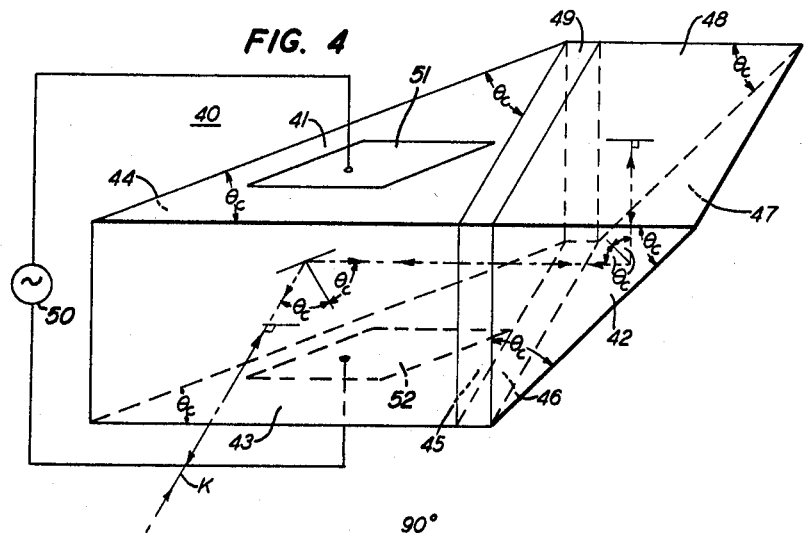
FIG. 4 depicts a critical angle prism in accordance with the invention in which light rays travelling in the preferred direction undergo plural total reflections in mutually orthogonal planes of incidence.

The angular selectivity provided by the simple prism 11 extends only in the plane of reflection shown in FIG. 1. A higher degree of selectivity for all azimuths of deviation from the preferred direction can be obtained by the use of an arrangement including a plurality of surfaces at which internal reflections can occur near the critical angle. One arrangement embodying this approach is depicted in FIG. 4 which shows a composite prism 40 providing angular selectivity in the horizontal and vertical planes. The prism 40 consists, in effect, of two prisms 41 and 42 of the type shown in FIG. 1. Both prisms have a cross-section which is an isosceles triangle with the base angles to $\theta_c$, the critical angle for total internal reflection. The prism 41 has an entrance face 43, a critical angle reflection face 44 which forms an interface between the high index material of the prism and an external medium of lower refractive index. The prism 41 also has an exit surface 45 which corresponds geometrically to the reflective surface 17 of the prism 11 shown in FIG. 1. The exit surface 45 is, however, uncoated so that light rays internally incident thereon may pass through to enter the prism 42 through its entrance face 46.

The prism 42 also has a critical angle reflection surface 47 and a reflection surface 48 which is provided with a reflective coating like that on the surface 17 of the prism 11 shown in FIG. 1. The planes of incidence of each of the critical angle reflection surfaces 44 and 47 are mutually orthogonal, the latter being so positioned with respect to one another that light rays incident on the surface 44 in the preferred direction are totally internally reflected at the critical angle to incidence on the surface 47 at substantially the critical angle. Such rays are reflected from the surface 47 to normal incidence on the reflective surface 48 which reflects them back over the path by which they arrived. Because the directional sensitivity of the critical angle reflection surfaces 44 and 47 is greater for waves polarized parallel to the plane of incidence, it is desirable to rotate the plane of polarization by 90° as the wave travels between the surfaces. This is accomplished in the illustrative embodiment depicted in FIG. 4 by a half-wave plate 49, inserted between surfaces 45 and 46.

Figure 5:
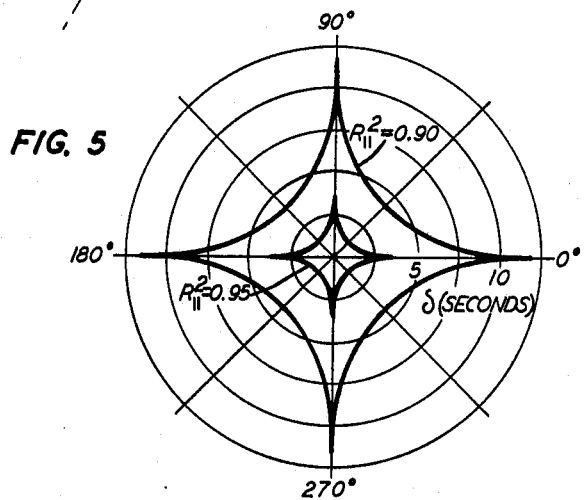
FIG. 5 is a plot of parameters associated with the embodiment shown in FIG. 4.

The dependence of reflectivity on the deviation $\delta$ from the preferred direction and on the azimuth angle $\varphi$ of the deviation may be obtained for the prism of FIG. 4 by applying Equations 1 and 2. Incident rays entering the system through the prism face 43 undergo two reflections at the horizontal selection surface 44 and two reflections at the vertical selection surface 47. Curves of equal reflectivity are plotted in FIG. 5 as a function of the azimuth angle $\varphi$ for the case of $n=1.64$. It will be appreciated, of course, that additional discrimination against rays travelling in other than the preferred direction may be obtained from more complicated arrangements of critical angle reflection surfaces in which the discrimination from successive pairs of reflections is additive. Such arrangements may include means for rotating the plane of polarization of the light between reflections so as to maximize the selectivity.

Figure 6:
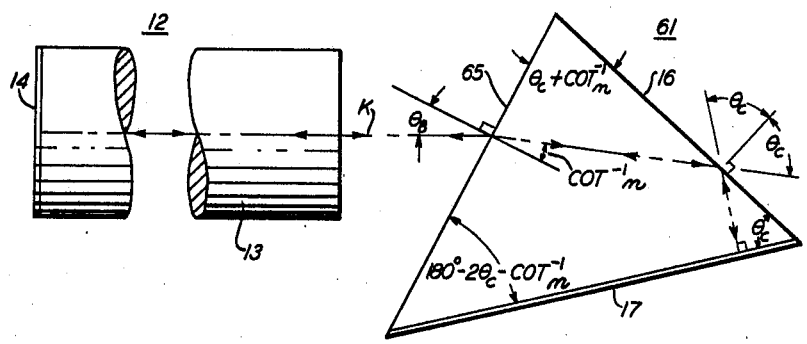
FIG. 6 depicts an optical maser with a critical angle prism embodying the invention, in which light rays propagating in the preferred direction for reflection enter the prism at Brewster's angle to the entrance face.

In some instances it may be desirable to minimize reflections for light rays travelling in the preferred direction and incident on the entrance face of a prism embodying the invention. A prism designed with this objective in mind is illustrated in FIG. 6. The cross-section of the prism 61 is a scalene triangle with vertex angles equal respectively to $\theta_c$, $\theta_c$+arc cot $^{-1}n$, and 180°−2$\theta_c$−cot $^{-1}n$. The entrance face 65 of the prism 61 is inclined to the preferred direction at Brewster's angle. At this angle light waves polarized with the electric vector parallel to the plane of incidence pass through the surface without reflection. Rays entering the prism 61 at this angle are refracted and are incident on the surface 16 at substantially the critical angle. Such rays are totally reflected from surface 16 to normal incidence on the reflective surface 17 whereby they are reflected back over the same path to emerge from the prism in the opposite sense of the preferred direction. Rays travelling in other than the preferred direction are scattered or attenuated in the manner explained in connection with FIG. 1. It will be appreciated, of course, that Brewster angle entrance surfaces, such as the surface 65 of the prism 61, may also be employed in conjunction with more complex arrangements such as the prism illustrated in FIG. 4.

Figure 7:
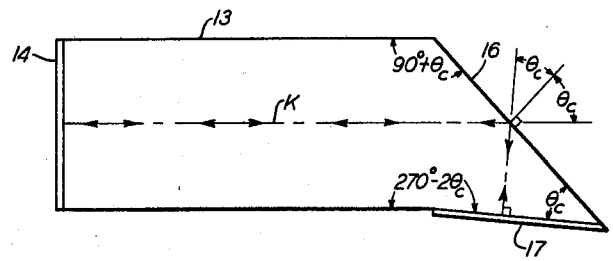
FIG. 7 depicts an optical maser in which the critical angle prism is integral with the active medium.

In some instances where the principle of the invention is to be employed in connection with an optical maser having an active medium of relatively high refractive index, it is considered advantageous to avoid the necessity for a separate prism by utilizing total internal reflection at the critical angle from an interface between the high index active medium and a relatively low index external medium. An arrangement of this type is illustrated in FIG. 7 wherein parts corresponding to the parts of previously described embodiments are indicated by the same reference numerals. The normals of surfaces 14 and 17 in FIG. 7 are inclined to each other at twice the critical angle. Mode selection is provided by the critical angle reflection interface 16 in conjunction with the reflective surface 17 which is adapted to reflect rays into the preferred direction to reincidence on the interface 16. The cavity resonator of the optical maser shown in FIG. 7 has an elongated light beam path defined by the reflective surfaces 14 and 17, together with the interface 16.

Figure 8:
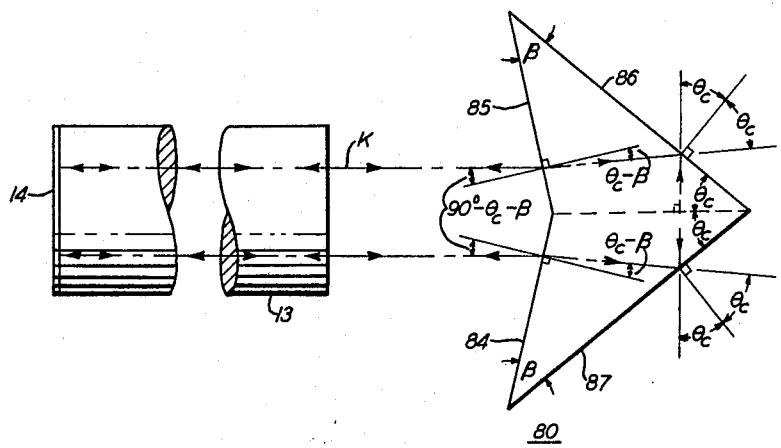
FIG. 8 depicts an optical maser with a critical angle prism embodying the invention, in which light rays travelling in the preferred direction emerge, after two reflections at the critical angle, on a path parallel to the incident path.

The variation of the invention depicted in FIG. 8 provides increased directional selectivity which is however accompanied by a displacement of the reflected light beam. The prism 80 has two entrance faces 84 and 85 which are inclined at an angle to the preferred direction so that rays propagating in that direction are refracted thereat. Prism surfaces 86 and 87, which form interfaces between the relatively high index material of the prism and the relatively low index material external thereto, are inclined to the preferred beam path within the prism at substantially the critical angle for total internal reflection. The angle $\beta$ may be adjusted so that the preferred rays propagate between surfaces 86 and 87 over a path which is normal to the plane of symmetry of the prism 80, in which case the external beam paths are displaced but parallel. Other choices of $\beta$ will result in external paths which are not parallel, and this result may be desired in some instances. If tan (90°−$\theta_c$−$\beta$) is set equal to $n$, the refractive index, the entrance surfaces, will be at Brewster's angle for parallel paths.

It can be seen from an examination of FIG. 8 that light rays traversing the preferred beam path within the optical resonator defined by the reflective surface 14 in conjunction with the prism undergo two critical angle reflections for each normal type reflection at the surface 14. Thus, the directional selectivity of the arrangement is increased while the losses due to normal type reflections are decreased.

Substantial mode selection has been observed in an optical maser utilizing an arrangement in accordance with the invention as illustrated in FIG. 1. The active medium consisted of a cylindrical ruby rod. The prism was fabricated from flint glass having a refractive index of 1.6396±.0001 at 6943 A. and a critical angle of 37°/35′/1″±5″ measured at room temperature. The prism angle was set equal to the critical angle with an accuracy of ±8″. The angle of the entrance face 15 with respect to the preferred direction, although not critical to the operation of the invention, was set at 90°±2′. The surface 17 was coated with a multilayer dielectric reflector to have a reflectivity of 0.99 at 6943 A. The entrance face 15 was provided with an antireflection coating. The prism height was one centimeter and the sides of the prism were 1.3, 1.3 and 2.1 centimeters, respectively.

The cylindrical ruby rod had a nominal $Cr^{+3}$ concentration of 0.05 percent, a diameter of 0.636 centimeter and a length of 7.62 centimeters. It was fabricated from stock selected for minimum scattering, high uniformity in C axis orientation and minimum strain as indicated by examination in polarized light. Despite the high optical quality of the rod, the full beam width of the laser light at half intensity with a pump level sixty percent above threshold and a resonator formed by plane parallel reflectors was 18', an angle not significantly smaller than observed with most rods. However, when the same rod was included in an arrangement of the type shown in FIG. 1, the full width of the far-field emission pattern at one-half intensity was only 6' for polarization parallel to the plane of incidence. For waves polarized perpendicular to the plane of incidence, the width of the far-field was 14'. Thus the improvement in beam collimation is most marked for parallel polarization as predicted by FIG. 3. For parallel polarization the mode selecting action of the prism resulted in an increase in energy per unit solid angle of about twenty-seven percent relative to the perpendicular polarization, within an angular width of about twice the diffraction width. The far-field width measured at three-quarters peak intensity showed a reduction by a factor of over five.

Thus, the application of the invention to a typical optical maser resulted in an increase in the energy emitted near the center of the beam as well as a substantial reduction in the beam width. The spatial coherence of the laser emission is thereby significantly improved. The increase in average brightness at the center of the beam indicates that stored energy in the active medium which would otherwise have been diverted to off-axis modes was made available by the prism for radiation in the preferred direction.

The rapid change in reflectivity of a prism of the invention as a function of the incident angle as well as a function of the refractive index may be advantageously employed in high gain pulsed gas lasers which ordinarily tend to oscillate strongly in many off-axis modes. The techniques of the invention are also useful in conventional gas lasers in which spatially nonuniform depopulation of excited states due to laser action in the dominant mode may lead to preferred oscillation in higher order off-axis modes. The function of the prisms embodying the invention is to provide increased discrimination to suppress the unwanted modes thereby resulting in increased power output in the preferred modes. Furthermore, the angular divergence of solid-state lasers can be reduced and the brightness of the central portion of the emission enhanced. The frequency width of the emission from optical masers is also reduced by suppression of off-axis modes.

It is also characteristics of critical angle mode selectors embodying the invention that the prism reflectivity at the preferred angle decreases rapidly for wave lengths longer than the preferred wavelength. Thus unwanted oscillations at low frequencies may be suppressed in an optical maser using the invention.

The principles of the invention may also be employed in optical mixers or modulators in which the critical angle reflection occurs at an interface between a high index nonlinear optical medium and a low index medium. When the nonlinear medium or prism is an element of an optical resonator, the losses of the resonator and therefore the intensity of the emission can be modulated by applying a time-varying electric field as by generator 50 connected by means of electrodes 51 and 52 across the parallel faces of prism 41 as shown in FIG. 4. Techniques for the use of internal resonator modulators of other types are known to workers in the art and may be applied to modulators embodying the present invention. With suitable nonlinear media the modulating field may be a radio-frequency, microwave or even a second optical frequency electromagnetic wave.

Many other variations and modifications of the invention are possible and may be made by those skilled in the art without departing from the principles disclosed herein.

What is claimed is:
1. An optical maser comprising
an active medium having an energy level structure including a pair of optically connected levels with an energy separation corresponding to the operating wavelength,
means for producing a population inversion between said pair of levels,
means defining an elongated light beam path through said medium,
said beam path defining means including a surface portion forming an interface between a region of higher refractive index lying in said beam path and a region of lower refractive index lying outside said beam path,
said surface portion being inclined to said beam path at substantially the critical angle for total internal reflection,
and means for directing light rays reflected from said surface at substantially the critical angle to reincidence thereon at substantially the critical angle,
light rays so directed iteratively traversing said beam path.

2. An optical cavity resonator comprising
means defining an elongated interior light beam path,
means forming an interface between a region of relatively high refractive index extending overat least a part of said beam path and a region of relatively low refractive index exterior to said beam path,
said interface being inclined to said beam path at substantially the critical angle for total internal reflection,
and means for reversing the propagation direction of light rays reflected from said interface at substantially the critical angle to reincidence thereon at substantially the critical angle,
light rays so reflected iteratively traversing said beam path.

3. An optical maser comprising
an optical cavity resonator containing an active medium of relatively high refractive index,
the bounds of said resonator including first and second planar reflective surfaces and a planar interface between said medium and a region of relatively low refractive index,
said first and second surfaces being oriented with their normals inclined with respect to each other at substantially twice the critical angle for total internal reflection at said interface,
said interface being oriented with its normal inclined with respect to the normals of said first and second surfaces at substantially the critical angle for total internal reflection,
light rays normally incident on either of said first and second surfaces being reflected therefrom to said interface and there being totally reflected to normal incidence on the other of said first and second surfaces,
and means for producing a population inversion in said medium.

4. Apparatus for selectively reflecting light rays propagating in a preferred direction comprising
a prism of an optically transparent material having a relatively high refractive index, said prism having means for admitting into said prism light rays for propagation therein in the preferred direction,
a surface portion forming an interface with a medium of relatively low refractive index,
said surface portion being oriented with its normal inclined to the preferred direction in said prism at substantially the critical angle for total internal reflection,
and means for directing rays reflected from said surface portion at substantially the critical angle to reincidence thereon at substantially the critical angle, light rays so directed being totally reflected from said surface portion to emerge through said entrance face in substantially the preferred direction.

5. Apparatus for selectively reflecting light rays propagating in a preferred direction comprising
a prism of an optically transparent material having a relatively high refractive index, said prism having
means for admitting light rays for propagation in the preferred direction within said prism,
an optically flat surface for forming an interface between said prism and a medium of relatively low refractive index,
said surface being oriented with its normal inclined to the preferred direction in said prism at substantially the critical angle for total internal reflection,
and means for reversing the propagation direction of rays totally reflected from said surface to reincidence thereon at substantially the critical angle.

6. Apparatus for selectively reflecting light rays propagating in a preferred direction comprising
a prism of an optically transparent material having a relatively high refractive index,
the cross-section of said prism being an isosceles triangle with base angles substantially equal to the critical angle for total internal reflection,
one of the two equal sides being internally reflective to normally incident light rays and the other being substantially nonreflective,
light rays entering said prism at normal incidence through the nonreflective one of said equal sides being totally internally reflected at the side opposite the apex, normally incident on and reflected from said reflective side, totally reflected a second time at the side opposite the apex and emergent through the nonreflective side normal thereto.

7. Apparatus for selectively reflecting light rays propagating in a preferred direction comprising
a prism of an optically transparent material having a relatively high refractive index,
the cross-section of said prism being a scalene triangle with vertex angles equal, respectively to $\theta_c$ where $\theta_c$ is the critical angle for total internal reflection, $180°-2\theta_c-\cot^{-1}n$ where $n$ is the refractive index of said prism, and $\theta_c+\cot^{-1}n$, the sides opposite said vertex angles being designated first, second, and third, respectively,
said third side being internally reflective to light rays normally incident thereon,
light rays incident at Brewster's angle on said first side entering said prism, being refracted to incidence on said second side at substantially the critical angle, being then totally reflected at the critical angle to normal incidence on said third side, and being reflected back over the same path to emerge from said first side at Brewster's angle thereto.

8. Apparatus for selectively reflecting light rays propagating in a preferred direction comprising
a prism of an optically transparent material having a relatively high refractive index, said prism having
means for admitting light rays for propagation therein in the preferred direction,
a first optically flat surface forming an interface between said prism and a medium of relatively low refractive index,
said first surface being oriented with its normal inclined to the preferred direction at substantially the critical angle,
light rays internally incident on said first surface at substantially the critical angle being totally reflected,
a second optically flat surface forming an interface between said prism and a medium of relatively low refractive index,
said second surface being oriented with its normal inclined at substantially the critical angle to the propagation direction of light rays reflected from said first surface at substantially the critical angle,
the plane of incidence of said light rays at said first surface being parallel to the plane of incidence at said second surface,
and means for directing light rays reflected from said second surface at substantially the critical angle to reincidence thereon at substantially the critical angle.

9. Apparatus for selectively reflecting light rays propagating in a preferred direction comprising
a prism of an optically transparent material having a relatively high refractive index, said prism having
means for admitting light rays for propagation therein in the preferred direction,
a first optically flat surface forming an interface between said prism and a medium of relatively low refractive index,
said first surface being oriented with its normal inclined to the preferred direction at substantially the critical angle,
light rays internally incident on said first surface at substantially the critical angle being totally internally reflected,
and a second optically flat surface forming an interface between said prism and a medium of relatively low refractive index,
said second surface being oriented with its normal inclined at substantially the critical angle to the propagation direction of light rays reflected from said first surface at substantially the critical angle,
the plane of incidence of said light rays at said first surface being normal to the plane of incidence at said second surface.

10. Apparatus as claimed in claim 9 and further including
means intermediate said first and second surfaces for rotating by 90° the plane of polarization of light rays reflected from said surfaces at substantially the critical angle.

11. Apparatus for modulating light wave energy propagating in a preferred direction comprising
means forming an interface between a medium of relatively low refractive index,
said high index medium exhibiting nonlinear optical properties,
means for directing a light beam to be modulated to incidence on said interface from within said high index medium,
said beam being incident on said interface at substantially the critical angle for total internal reflection,
and means for applying a variable electric field to said high index medium for modulating the light beam reflected from said interface.

References Cited

UNITED STATES PATENTS 3,248,671    4/1966    Dill et al. _____ 331—94.5
3,296,921    1/1967    Polster.

FOREIGN PATENTS 1,347,714    11/1963    France.

OTHER REFERENCES

Okaya, A., Off-Axial Mode Rejection of Ruby Laser Using Ball Mirror, Proceedings of IEEE, vol. 51, July 1963, pp. 1033–1034.

JEWELL H. PEDERSEN, Primary Examiner

A. A. KASHINSKI, Assistant Examiner